(12) United States Patent
Olsson et al.

(10) Patent No.: US 12,091,469 B2
(45) Date of Patent: *Sep. 17, 2024

(54) METHOD AND SYSTEM FOR THE PRODUCTION OF A SPINNING DOPE COMPOSITION

(71) Applicant: TREETOTEXTILE AB, Bjarred (SE)

(72) Inventors: Carina Olsson, Gothenburg (SE); Bengt Hagström, Gothenburg (SE); Tobias Köhnke, Gothenburg (SE)

(73) Assignee: TREETOTEXTILE AB, Bjarred (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,465

(22) Filed: Jul. 26, 2023

(65) Prior Publication Data

US 2023/0365718 A1 Nov. 16, 2023

Related U.S. Application Data

(60) Continuation of application No. 17/346,293, filed on Jun. 13, 2021, now Pat. No. 11,753,482, which is a
(Continued)

(30) Foreign Application Priority Data

Apr. 14, 2016 (EP) .................................. 16165374

(51) Int. Cl.
*B01F 33/82* (2022.01)
*B01F 21/00* (2022.01)
(Continued)

(52) U.S. Cl.
CPC .............. *C08B 1/003* (2013.01); *B01F 21/02* (2022.01); *B01F 33/821* (2022.01); *C08J 3/05* (2013.01);
(Continued)

(58) Field of Classification Search
CPC ........ B01F 21/02; B01F 33/82; B01F 33/821; C08B 1/003; C08B 1/08;
(Continued)

(56) References Cited

U.S. PATENT DOCUMENTS 2,289,085 A * 7/1942 Van Halewijn ........... D01F 2/02
264/28
3,034,910 A 5/1962 Walter
(Continued)

FOREIGN PATENT DOCUMENTS

| AT | 408986 B | 4/2002 |
|---|---|---|
| CN | 102924611 B | 2/2013 |

(Continued)

OTHER PUBLICATIONS

International Search Report mailed Jun. 12, 2017 for PCT Application No. PCT/EP2017/058785.

*Primary Examiner* — Leo B Tentoni
(74) *Attorney, Agent, or Firm* — MOSER TABOADA

(57) ABSTRACT

The present disclosure describes a method for the production of a spinning dope composition, said method comprising a homogenization involving mixing a cellulosic pulp material in alkali solution, mixing implying supplying a power density to agitators used in the homogenization of at least 150 kW/m³ (KW supplied to agitators per mixed unit of liquid volume), and thereafter a dissolution involving mixing of the cellulosic pulp material in the alkali solution to obtain a spinning dope composition, wherein the power density supplied to agitators used in the dissolution step is maximum 75 kW/m³ (KW supplied to agitators per mixed unit of liquid volume); and wherein the cellulosic pulp material in alkali solution is kept at a temperature of less than 0° C. during the homogenization and during at least part of the dissolution.

(Continued)

The present disclosure is also directed to a system intended for the production of a spinning dope composition.

44 Claims, 4 Drawing Sheets

Related U.S. Application Data division of application No. 16/093,271, filed as application No. PCT/EP2017/058785 on Apr. 12, 2017, now Pat. No. 11,299,556.

(51) Int. Cl.
| | |
|---|---|
| *C08B 1/00* | (2006.01) |
| *C08B 1/08* | (2006.01) |
| *C08J 3/05* | (2006.01) |
| *C08K 5/21* | (2006.01) |
| *C08L 1/02* | (2006.01) |
| *D01D 1/02* | (2006.01) |
| *D01D 5/06* | (2006.01) |
| *D01F 1/10* | (2006.01) |
| *D01F 2/02* | (2006.01) |
| *D21H 13/08* | (2006.01) |
| *C08K 3/22* | (2006.01) |

(52) U.S. Cl.
CPC ............... *D01D 1/02* (2013.01); *D01F 2/02* (2013.01); *C08K 2003/2296* (2013.01); *D10B 2201/22* (2013.01)

(58) Field of Classification Search
CPC ..... C08K 2003/2296; C08K 5/21; C08L 1/02; D01D 1/02; D01D 5/06; D01F 1/10; D01F 2/02; D10B 2201/22; D21H 13/08
USPC .... 264/28, 187, 178 F, 203, 211; 162/157.6, 162/157.7; 106/164.3, 164.5, 200.3, 106/204.01
See application file for complete search history.

(56) References Cited

U.S. PATENT DOCUMENTS

| | | | |
|---|---|---|---|
| 4,634,470 A | | 1/1987 | Kamide et al. |
| 4,999,149 A | * | 3/1991 | Chen ..................... D01F 2/02 264/187 X |
| 5,123,962 A | | 6/1992 | Komuro et al. |
| 5,401,447 A | | 3/1995 | Matsui et al. |
| 5,605,567 A | | 2/1997 | Lancaster |
| 6,106,763 A | | 8/2000 | Mikolajczyk et al. |
| 6,972,102 B1 | | 12/2005 | Bauer |
| 7,108,907 B1 | | 9/2006 | Okajima et al. |
| 2004/0051200 A1 | | 3/2004 | Struszczyk |
| 2008/0023873 A1 | | 1/2008 | Mankad |

FOREIGN PATENT DOCUMENTS

| | | |
|---|---|---|
| CN | 102964606 B | 3/2013 |
| CN | 105113034 A | 12/2015 |
| EP | 1900860 A1 | 3/2008 |
| EP | 2116557 A1 | 11/2009 |
| JP | H03163135 A | 7/1991 |
| JP | H09316101 A | 12/1997 |
| JP | 2001139697 A | 5/2001 |
| JP | 4028003 B2 | 12/2007 |
| WO | WO-0107485 A1 | 2/2001 |
| WO | WO-0222924 A1 | 3/2002 |

* cited by examiner

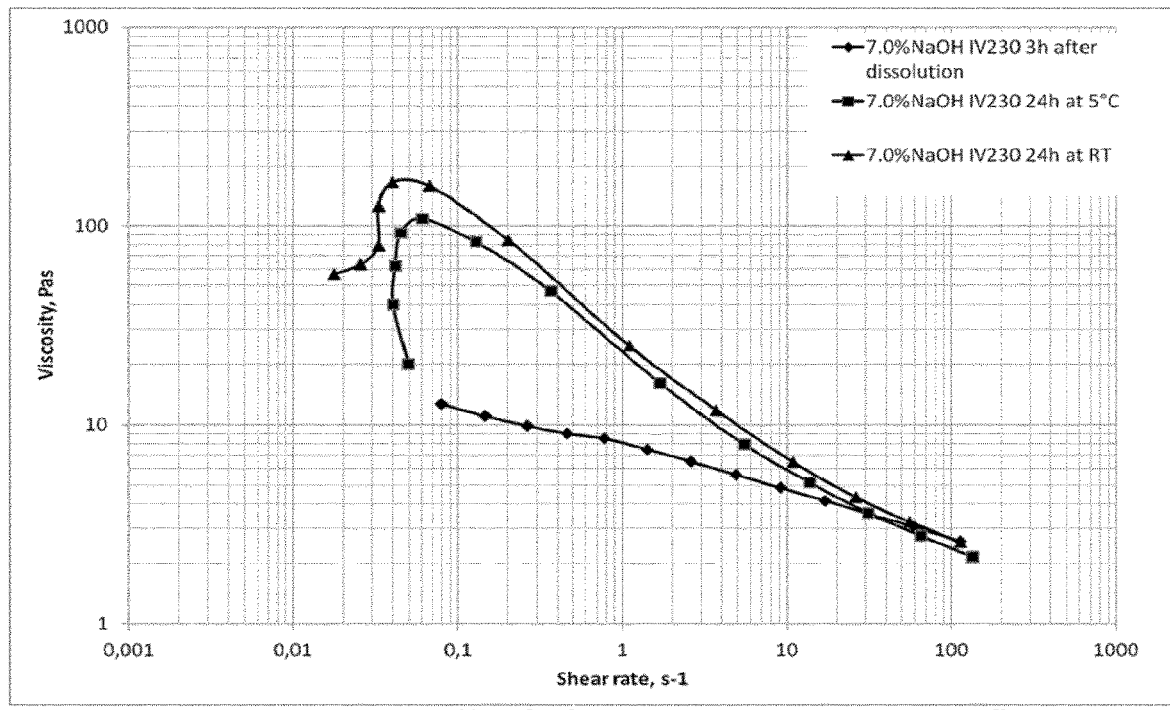
Fig. 1. Viscosity vs. shear rate in 7.0 wt% NaOH for a spinning dope composition at different conditions.
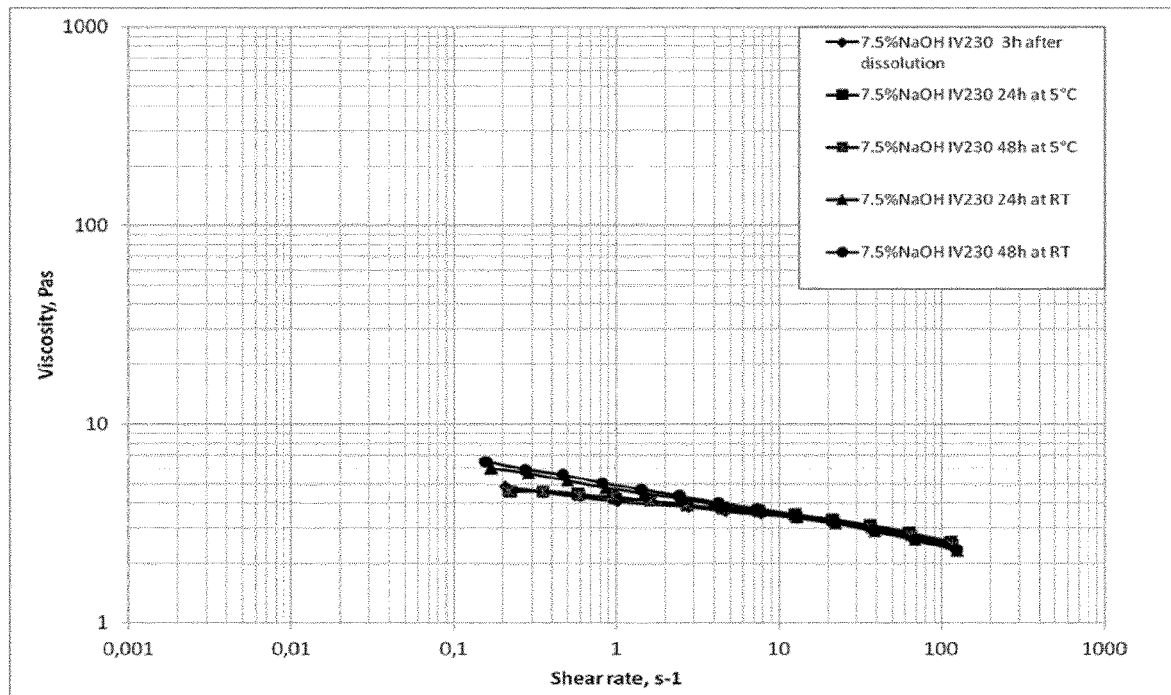
Fig. 2. Viscosity vs. shear rate in 7.5 wt% NaOH for a spinning dope composition at different conditions.

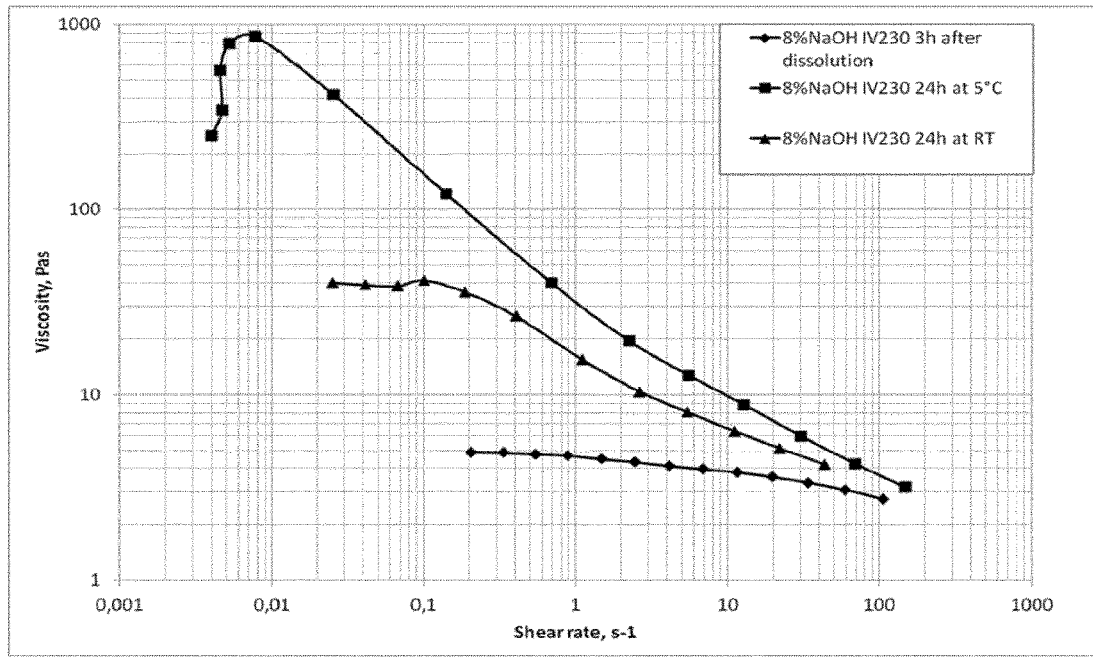
Fig. 3. Viscosity vs. shear rate in 8.0 wt% NaOH for a spinning dope composition at different conditions.
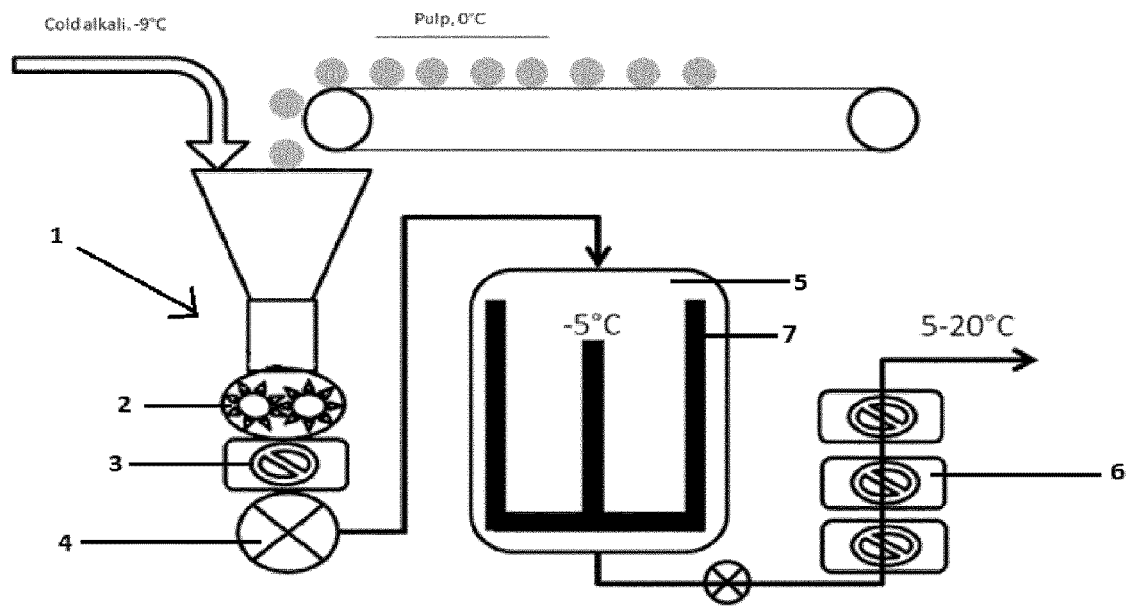
Fig. 4.

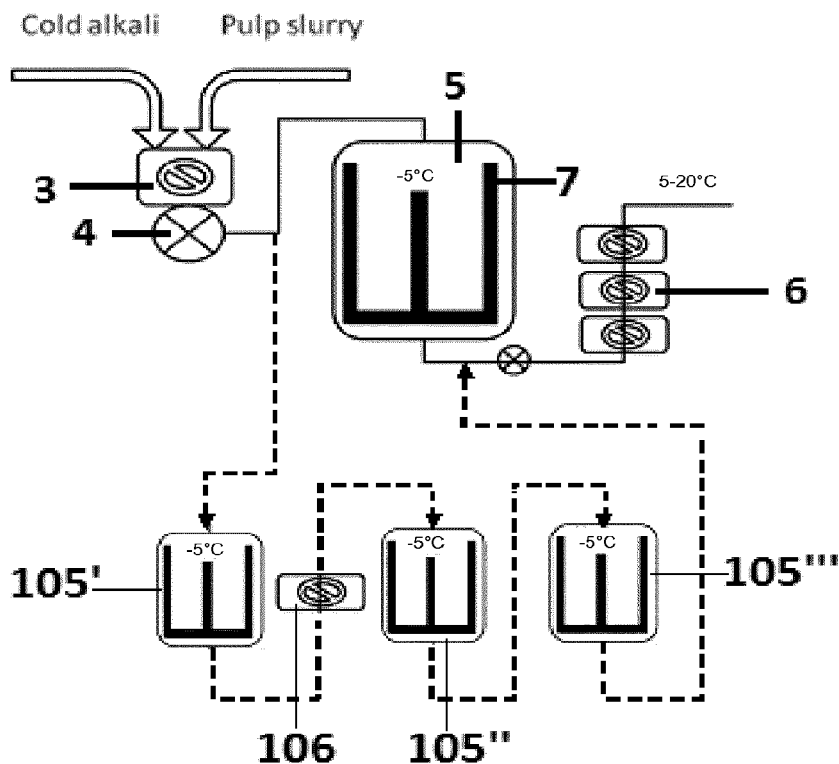
Fig. 5.
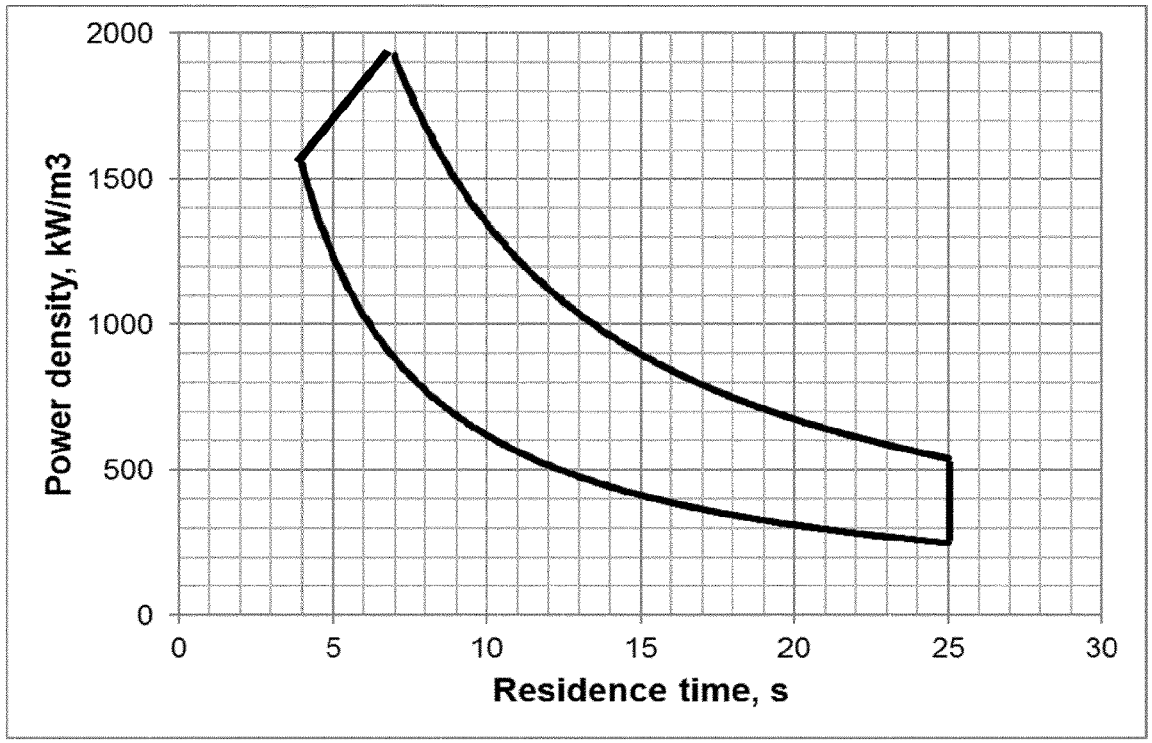
Fig. 6. A preferred range of power density vs. the residence time in the homogenizer.

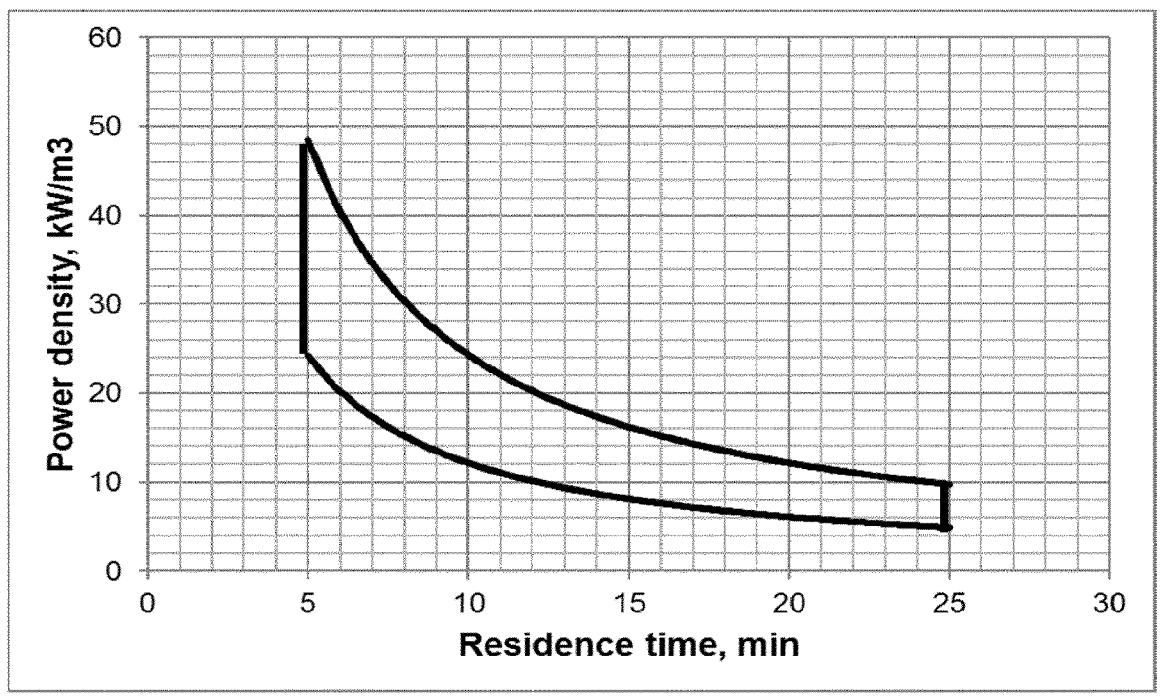
Fig. 7. A preferred range of power density vs. residence time in the dissolver.
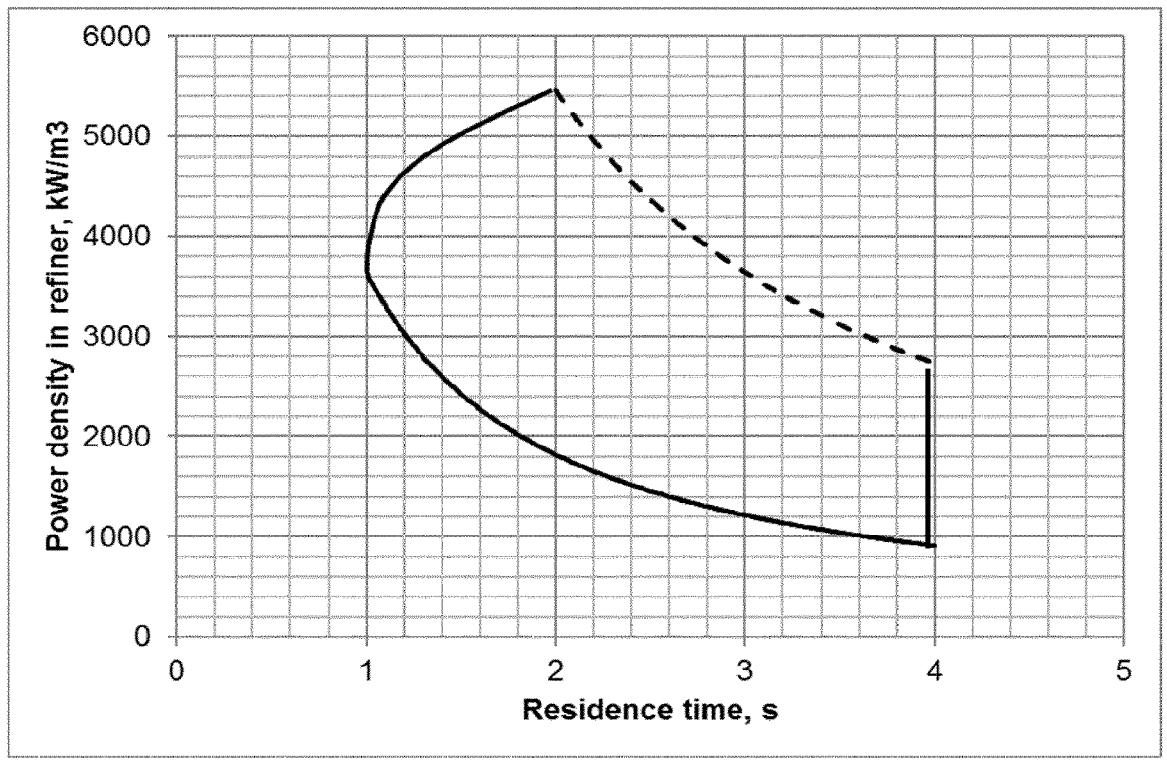
Fig. 8. A preferred range of power density vs. residence time in the refiner.

METHOD AND SYSTEM FOR THE PRODUCTION OF A SPINNING DOPE COMPOSITION

CROSS-REFERENCE TO RELATED APPLICATIONS

This application is a continuation of U.S. application Ser. No. 17/346,293, filed on Jun. 13, 2021, which issued as U.S. Pat. No. 11,753,482 on Sep. 12, 2023, which is a divisional of U.S. patent application Ser. No. 16/093,271, filed on Oct. 12, 2018, which issued as U.S. Pat. No. 11,299,556 on Apr. 12, 2022, and which is a national phase application of the International Application Number PCT/EP2017/058785, filed on Apr. 12, 2017, which claims priority to European Patent Application No. 16165374.6, filed on Apr. 14, 2016, each of which is hereby incorporated by reference in its entirety.

FIELD OF THE INVENTION

The present invention relates to a method for the production of a spinning dope composition and to a system intended for the production of a spinning dope composition.

TECHNICAL BACKGROUND

Most dissolving pulps manufactured and used today by industry to produce rayon fibers and cellophane film by the viscose process are not sufficiently soluble in alkali as is. This is true even though the xanthogenation process using carbon disulfide and sodium hydroxide (viscose process) promote dissolution in alkali. In the viscose process the cellulose is adapted by the steeping process involving swelling and thermo oxidative hydrolysis of the alkaline cellulose bringing about a reduction in DP and improved accessibility of chemicals before contacting the pulp with carbon disulfide. In a similar way, dissolving pulp need to be adapted before being sufficiently directly soluble in alkali. Several methods have been suggested in the literature for such an adaptation. Examples are enzymatic treatment of cellulose (EP21 1 6557A1), acidic hydrolysis and/or steam explosion (STEX) alone (U.S. Pat. Nos. 5,401,447, 4,634,470) or in combination with wet pulverization in alkali (U.S. Pat. No. 7,108,907B1), hydrothermal hydrolysis in autoclave (U.S. Pat. No. 6,106,763) and hydrothermal treatment with or without addition of hydrogen bond cleaving agents in a twin screw extruder (U.S. Pat. No. 4,634,470). It has also been suggested that adaptation and dissolution under "Q-condition" can be done simultaneously by inducing cavitations in the pulp alkali slurry by means of sonication (U.S. Pat. No. 5,605,567).

EP21 1 6557A1 teaches that a cellulose dope can be manufactured from a fibrous cellulosic raw material such as paper making pulp or dissolving grade pulp with DP in the range 500 and 1200 by first subjecting the cellulose fibers to a mechanical treatment in the wet state so that the outer surfaces of the fibers are broken at least partially followed by an enzymatic treatment (endoglucanase type cellulase) that reduces DP by 30 to 60% compared to the initial DP. After the enzymatic pre-treatment, the cellulosic raw material is mixed in an aqueous solution which contains alkali metal hydroxide (e.g. sodium hydroxide) and zinc salt (e.g. zinc oxide) in order to create conditions where the cellulosic raw material can begin to dissolve. The final concentrations of NaOH and ZnO are given as 4.5-6.5% and 0.5-1.5% respectively. It is further taught that for production of cellulosic fibers, the target cellulose concentration should be at least 5.0%. After the cellulosic raw material has been mixed with the aqueous alkali solution, the obtained intermediate product (slurry) is frozen so that the product becomes solid. Before producing end products (e.g. fibers) from the frozen product it is melted. Due to melting the cellulose dissolves, the solution is clear and it does not contain any insoluble portions when it is studied microscopically and thus, it is ready for further processing.

There are several problems associated with the method described for producing a cellulose dope in EP21 1 6557A1, the most important being that large amounts of enzymes are consumed and that such enzymes are expensive making OPEX prohibitively high. The process of freezing a slurry of pulp fibers in alkali (down to −35° C. as given in an example) followed by melting is time consuming and energy demanding. The fact that no insoluble portions can be seen in the dope under the microscope does not mean that the dope is suitable for e.g. fiber production since it still can contain gel particles not visible under the microscope. EP21 16557A1 does not disclose any data on filter clogging values that could be used to judge the content of gel particles and thus the suitability of the produced dope for e.g. industrial scale fiber production nor are any data given on the stability of the dope against gelation over time. No guidance is given to any preferred or optimized design of equipment used for the melting of the frozen slurry forming the final cellulose dope.

In U.S. Pat. No. 4,634,470 there is disclosed a cellulose dope comprising an aqueous alkali solution containing at least 3% cellulose having a DP of at least 100, wherein in the 13 C-NMR spectrum of the dissolved cellulose, the C4 carbon peak is found at a magnetic field higher by at least 7 ppm than the magnetic field of the C4 carbon peak of solid cellulose. U.S. Pat. No. 4,634,470 teaches that the cellulose dope can be manufactured from wood pulp by subjecting a mixture of pulp and hydrogen bond-cleaving solution (e.g. water) to a temperature of 100° ° C. to 350° C. at a pressure of 10 bar to 250 bar for some time followed by promptly discharging the mixture into open air thereby reducing the DP of the treated cellulose. To form a dope the resulting cellulose is mixed with an aqueous alkali solution maintained at a temperature not higher than 50° C. The mixture is stirred at a temperature not higher than 10° C. to dissolve the cellulose. The treatment of pulp prior to dissolution can for instance be made in a twin screw extruder or an autoclave (STEX). The best results regarding solubility of pulp in cold alkali and stability of resulting dope were obtained if the pulp was acid hydrolyzed to some extent before the high temperature and high pressure treatment.

A problem with the teachings in U.S. Pat. No. 4,634,470 to obtain a dope free from visible undissolved fragments and being stable against gelation at room temperature for several days is that the high temperature/high pressure treatment needs to be preceded by an acid hydrolysis process of the pulp making the total process both slow and expensive.

U.S. Pat. No. 5,401,447 describes steam explosion (STEX) and dissolution of wood pulp in aqueous alkali solution having an alkali concentration of 5-15%. U.S. Pat. No. 5,401,447 is focused on acidic coagulation chemistry and temperature as well as steaming as a method of slightly improving wet strength of fibers and films after coagulation. Detailed information about the dope quality is lacking.

U.S. Pat. No. 6,106,763 teaches that a cellulose dope can be manufactured from dissolving pulp by first subjecting the pulp to a hydrothermal treatment at a temperature in the range from 100° C. to 200° C. and under a pressure in the range from 0.1 MPa to 1.5 MPa for about 2 to 6 hours. The depressurization is done slowly in a non-explosive manner. In the examples given DP is reduced from 577 to about 290-390, that is, reduced by 30-50%. The treated cellulose is then dissolved in an aqueous solution of alkali metal hydroxide at at least 0° C. to a homogenous cellulose solution containing 5-10% cellulose and at maximum 10% alkali metal hydroxide. In a further embodiment the dissolution is made in an alkali hydroxide solution which contains zinc compounds (e.g. ZnO) and/or urea. The addition of zinc compounds and/or urea to the alkali hydroxide solution is said to increase the stability against gelation of the dope. In the examples given the dried hydrothermally treated cellulose is first dispersed in water at temperatures in the range 3-7° C. then following is the addition of cold (−10° C. to −5° C.) alkali solution (18% NaOH and about 1.0% ZnO) under continuous agitation (mixer speed is 150-200 rpm). The agitation is continued for 30-60 minutes and the temperature of the final dope was about 6-8° C. Cellulose and sodium hydroxide concentrations were in the range 5.1-6.9% and 8.0-8.9% respectively.

There are some problems associated with the method described for producing a cellulose dope in U.S. Pat. No. 6,106,763. The mixing time needed after addition of cold sodium hydroxide solution is very long making it necessary to produce the dope in a batch wise fashion using a large mixing tank under industrially relevant production conditions. Further, the dissolution temperature of at least 0° C. may be too high to achieve a quick dissolution of the cellulose. No guidance is given to any preferred or optimized design of the mixer to be used for dissolving cellulose nor are any details given on the best way of combining the hydrothermally treated cellulose with the cold alkali. In some of the examples included in U.S. Pat. No. 6,106,763 fibers are spun from dopes manufactured according to the principles presented. Fiber strength is generally low (10 cN/tex) compared to commodity Rayon fibers (20 cN/tex) indicating that the dopes are less suitable for commercial fiber production. It is further known that dopes prepared according to U.S. Pat. No. 6,106,763 have very limited stability against gelation at room temperature and need to be stored under refrigerated conditions.

U.S. Pat. No. 7,108,907B1 teaches that a cellulose dope showing a low amount (less than 1.0%) of undissolved cellulose, having a high cellulose concentration (5-10%) and being stable against gelation at room temperature can be manufactured from pre-treated (acid hydrolysis and/or STEX) or non-pre-treated dissolving pulp, and without using anything else than aqueous sodium hydroxide (6.5-11.0%) as solvent, if the pulp is wet pulverized to a particle size of less than 30μm| prior to dissolution. It is further taught that the wet pulverization should be made in aqueous slurry with 0.5-6.5% sodium hydroxide having a cellulose consistency of at least 5.0%. The dissolution is accomplished by adjusting the sodium hydroxide concentration of the slurry to 6.5-11.0% and stirring the slurry at a temperature less than 10° C. limiting the shear rate to maximum 9000 s-1 and with the further requirement that the stirring speed of an outer agitating element should be less than 500 m/minute. A crystallinity of the cellulose in the wet pulverized slurry to be dissolved, as determined by NMR analysis, of 50% or less is further claimed as is also some other structural features of the cellulose in the final dope, also characterized by NMR analysis.

The main problem associated with the method described for producing a cellulose dope in U.S. Pat. No. 7,108,907B1 is the high energy consumption of the wet pulverization down to a particle size less than 30μη| making the dope production uneconomic.

U.S. Pat. No. 5,605,567 teaches the manufacture of a cellulose dope by subjecting an alkali pulp slurry to cavitations, for instance by means of sonication. The temperature should be in the range of −7 to 4° C. and the sodium hydroxide concentration in the range from 6 to 10%. The energy from the induced cavitations under alkali conditions during prolonged times bring about a reduction in DP of about 50-80% facilitating the dissolution in cold alkali.

A problem associated with the method described for producing a cellulose dope in U.S. Pat. No. 5,605,567 is that only a part of the cellulose is dissolved making the dope unsuitable for fiber spinning unless the DP is very low (e.g. 195). Such a low DP would result in products having poor mechanical properties.

One purpose of the present invention is to provide a method of providing a spinning dope in cold alkali having a high cellulose concentration, low filter clogging value and being resistant towards gelation at room temperature.

SUMMARY OF THE INVENTION

The above stated purpose is achieved by a method for the production of a spinning dope composition, said method comprising a homogenization involving vigorous mixing of a cellulosic pulp material in alkali solution, vigorous mixing implying supplying a power density to agitators used in the homogenization step of at least 150 KW/m3 (KW supplied to agitators per mixed unit of liquid volume), and thereafter a dissolution involving mixing of the cellulosic pulp material in the alkali solution to obtain a spinning dope composition, wherein the power density supplied to agitators used in the dissolution step is maximum 75 kW/m3 (kW supplied to agitators per mixed unit of liquid volume); and wherein the cellulosic pulp material in alkali solution is kept at a temperature of less than 0 Q C during the homogenization and during at least part of the dissolution.

With reference to the above disclosed method, the following should be mentioned about definitions and expressions.

First of all, the homogenization and dissolution may be regarded as two separate process steps, however the two steps may be performed in a single tank or tube reactor, or in several tanks and/or tube reactors, which may be arranged in series or in parallel.

Secondly, the expression "vigorous mixing" in the homogenization implies a high shear dispersive mixing. The vigorous mixing of pulp and liquid in the mixers ensures that the pulp fibers are almost instantaneously dispersed and that the fibers are experiencing a homogeneous chemical and thermal environment more or less instantaneously, at least within 120 seconds, preferably within 60 seconds, more preferably within 30 seconds, even more preferably within 15 seconds after combining alkali and pulp. This is further discussed below in relation to the figures and the examples.

Moreover, the time indicated above may also be interpreted as the average residence time in the high shear dispersive mixing device calculated as the internal volume of said device divided with the volumetric flow rate.

Moreover, also in the dissolution step or zone, a powerful mixing is applied. As notable below, however, the mixing speed is not as high as in the homogenization step or zone in order to prevent a fast temperature increase due to viscous dissipation of mechanical energy into heat. Hence, the "vigorous mixing" of the homogenization is a considerably more powerful mixing than the "mixing" of the dissolution. Preferably, the power density to agitators used in the homogenization step is in the range of 150-4000 kW/m3, and wherein the power density supplied to agitators used in the dissolution step is maximum 50 kW/m3. Furthermore, according to yet another embodiment, the power density supplied to agitators used in the homogenization step is in the range of 150-2500 kW/m3 (kW power supplied to agitator(s) per mixed unit of liquid volume), preferably in the range of 150-2000 kW/m3 and more preferably in the range of 200-2000 kW/m3, while the corresponding power density in the dissolution step is in the range of 2-50 kW/m3, preferably in the range of 5-30 kW/m3.

The power density is calculated by dividing the total power in kW supplied to the agitator(s) by the total liquid volume that the agitator(s) agitates, e.g. if an agitator with a power of 200 KW agitates a liquid volume of 0.5 m3, then the power density is 200 kW/0.5 m3=400 kW/m3.

Moreover, also in the dissolution step of the method, a powerful mixing is applied. As notable below, however, the mixing power is not as high as in the homogenization step in order to prevent a fast temperature increase due to viscous dissipation of mechanical energy into heat. Hence, the "vigorous mixing" of the homogenization is a considerably more powerful mixing than the "mixing" of the dissolution. Typically, the power density supplied to agitators used in the homogenization is at least a factor 5, preferably at least a factor 10, more preferably a factor in the range of 10-100, more preferably a factor in the range of 20-100, higher than the power density supplied to agitators used in the dissolution, and preferably the time for performing the dissolution is at least a factor 5, preferably at least a factor 10, longer than the time for performing the homogenization.

As understood from above, in addition to the mixing profile also the temperature is a key parameter of the method. As said, the temperature is held at less than 0 Q C during the homogenization and during at least part of the dissolution. The spinning dope composition produced in the dissolution may hold a temperature slightly above 0 Q C in the end of that step when the dissolution step is performed in a batch-wise manner, in a tube reactor, or with several CSTR (continuous stirred tank reactor) in series, however preferably more than 50% of the duration of the dissolution step occurs at a temperature below 0 Q C. In the case of a continuous dissolution step performed in only one CSTR or in parallel CSTRs, then the temperature should be held constantly at a temperature below 0 Q C, preferably below −3 Q C as further disclosed below.

The cellulosic pulp material and the alkali solution are preferably cooled separately before the homogenization. To give some examples, the cellulosic pulp material may be cooled to a temperature close to its freezing point, such as in the range of from 0 to 5 Q C. Moreover, the alkali solution is cooled to a temperature below 0 Q C, e.g. in the range of from −5 Q C to around −9 Q C, the latter being close to its freezing point. The exact combination of temperatures is dependent on the water content in the cellulosic pulp material. Suitable temperatures are further described below.

The combination of two steps, i.e. homogenization and dissolution, involving the mixing and temperature conditions disclosed above are not disclosed or hinted in the prior art.

BRIEF DESCRIPTION OF THE DRAWINGS

In FIG. 1 there is shown graphs on the viscosity vs. shear rate in a 7.0 wt % NaOH spinning dope composition at different conditions.

In FIG. 2 there is shown graphs on the viscosity vs. shear rate in a 7.5 wt % NaOH spinning dope composition at different conditions.

In FIG. 3 there is shown graphs on the viscosity vs. shear rate in a 8.0 wt % NaOH spinning dope composition at different conditions.

In FIG. 4 there is shown one embodiment of a system according to the present invention.

In FIG. 5 there is shown another embodiment of a system according to the present invention.

In FIG. 6 there is shown a preferred range, or window, of power density vs. residence time in a homogenizer.

In FIG. 7 there is shown a preferred range, or window, of power density vs. residence time in a dissolver.

In FIG. 8 there is shown a preferred range, or window, of power density vs. residence time in a subsequent refiner.

DETAILED DESCRIPTION OF THE INVENTION

In relation to the cellulosic pulp material, the cellulose feedstock to be used in the present invention is a cellulose pulp that can be manufactured by any commercial process for delignification of lignocellulosic biomass (including but not limited to kraft process, sulfite process, organosolv processes or processes separating lignin and cellulose by acidic hydrolysis). The cellulose starting cellulose material is preferably a dissolving cellulose pulp with a high alfa cellulose content, preferably an alfa cellulose content higher than about 88%.

The present invention is directed to solving the problem of, preferably continuously, producing a spinning dope solution of adapted dissolving pulp in cold alkali having a high cellulose concentration, low filter clogging value and being resistant towards gelation at room temperature.

To be industrially viable the cellulose spinning dope and the process for its manufacture need to fulfill a plurality of requirements. Important aspects are listed below.

The cellulose concentration in the dope needs to be sufficiently high (preferably higher than 5%) to secure an acceptable operating cost (OPEX).

The degree of polymerization (DP) of the cellulose in the dope needs to be sufficiently high (preferably higher than 200) in order to obtain acceptable mechanical properties of the final product. Degree of polymerization (DP) in this case was calculated from intrinsic viscosity (IV) as DP=0.7277*(IV)1 105, when the intrinsic viscosity was measured in cupri-ethylenediamine (CED) solution according to ISO5351:2010(E).

The filterability of the dope needs to be sufficiently high (filter clogging value preferably lower than 200) to avoid large amounts of reject (back wash filters) or frequent filter changes (press filter) affecting OPEX negatively. Especially for fiber production it is important that undissolved cellulose fragments, gel particles and other particular contaminants are removed to a sufficient extent to avoid clogging of spinneret capillaries and to affect the shaping process and final fiber properties negatively. With reference to the clogging value mentioned above and the examples below, clogging values were evaluated by performing filtration. The amount of solution passing through the filter (SIKA-FIL 20 from GKN Sinter Metals Filters GmbH in Germany, average pore size 20μηπ, 600 g/m2 metal fiber fleece, air permeability 415 L/min/dm2 at 200 Pa) were logged for each second after that an external pressure of 0.5 bar was applied. A plot with the inverse average flow rate [s/g, seconds per gram] versus the time [s] was made for each solution, and a linear regression was calculated. The first data points from each measurement were excluded from the calculation. The slope of the approximately linear curve (after the initial transient) multiplied by 10000 was reported as the clogging value.

The viscosity of the dope needs to be sufficiently low (preferably lower than 10 Pas measured at a shear rate of 1 s_1) to facilitate deaeration (removal of air bubbles), filtration and shaping into e.g. fibers, sponges or films, (low pressure drop).

The dope needs to be stable against gelation during the processes of deaeration, filtration, storage and extrusion. Since viscosity decreases (advantageous for deaeration, filtration and shaping) with increasing temperature it is advantageous if the dope is stable against gelation for a sufficiently long time (preferably longer than 24 hours) even at higher temperatures including room temperature.

The dope manufacturing process (combining alkali and adapted dissolving pulp forming a dope) is preferably such in its detailed embodiments that requirements 1-5 above can be fulfilled and that it can be applied in a viable and practical way in industrial scale. It should be pointed out that several of the above requirements are in conflict with each other. For instance, both a high cellulose DP and a high cellulose concentration are known to affect filterability and deaeration negatively and to increase viscosity and shorten the time to gelation.

The present invention is directed to providing: a method for producing a spinning dope composition, a spinning dope composition, and a system intended for the production of a spinning dope composition which are optimal based on the background and all aspects given above. One example of the focus points of the present invention is to provide a composition range of acid hydrolyzed dissolving pulp, sodium hydroxide, zinc oxide and water in combination with a specific direct dissolution process producing a spinning dope composition with high cellulose concentration, good filterability (low clogging value) and excellent stability against gelation at room temperature. The good gelation stability facilitates deaeration, filtration, dope transport and processing at room temperature at which the viscosity of the dope is low. Prior art dopes suffer from quick gelation at higher temperatures necessitating the storage and handling (filtration, deaeration, transport, processing) under refrigerated conditions (0° C.-10° C.) rendering viscosity high, and thus, handling difficult. The present spin dope production process is characterized by a very fast establishment, in the homogenization step, of a homogenous environment in terms of chemical composition and temperature surrounding the cellulose fibers and fragments, and this homogenization step is then followed by a dissolution step with a less powerful mixing and during which the actual dissolving of the cellulose pulp in the alkali solution occurs. The spin dope production process is further characterized by preferably being operated in a continuous fashion and being very fast compared to prior art processes (such as Viscose, Lyocell, direct dissolution in cold alkali).

Furthermore, another focus point is to provide suitable systems for forming spinning dope. As mentioned above, the method according to the present invention involves both homogenization and dissolution, and the suitable system is adapted for such steps.

There are several process parameters that are preferably considered in relation to the method according to the present invention. One is time. According to one embodiment, the homogenization, or residence time in the homogenization unit, is performed during a time of less than 120 s, preferably less than 60 s, more preferably less than 30 s, most preferably less than 15 s. The homogenization step involves a vigorous mixing and this part of the process should be performed during a short time range, enough to instantaneously disperse the pulp fibers in the alkali and pulp material mixture.

The dissolution step, however, involves comparatively milder mixing conditions, even if also this step is performed with powerful mixing. The time range of the dissolution step is normally longer than the homogenization. According to one embodiment, the dissolution is performed during a time period sufficient for complete dissolution of the cellulose polymers in the alkali solution. In relation to the expression "complete dissolution" this should not be interpreted in absolute terms, so also a substantially complete dissolution should be regarded as covered by this expression.

According to yet another embodiment of the present invention, the dissolution is performed during a time of at least 4 minutes, preferably during a time of 5-60 minutes, more preferably during a time of 5-45 minutes, most preferably during a time of 5-30 minutes. The dissolution should be performed at a time sufficient to produce an optimal spinning dope solution, e.g. in terms of having a low clogging value, such as below 200, even down to and below 50, as discussed below.

According to one embodiment, the temperature in the slurry (cellulosic pulp material in alkali solution) is held within a range of from −8 to −3 Q C during the homogenization and during at least part of the dissolution. The temperature profile and residence time of the process according to the present invention are interesting aspects. In relation to the temperature range of from −8 to −3 Q C it should be noted that the alkali solution may have a temperature below this range, such as e.g. a temperature of from −8 Q C to −25° C., before the point of mixing the alkali solution and the pulp material. Furthermore, the expression "at least part of the dissolution" once again refers to the fact that the final spinning dope composition produced at the end of the dissolution may have a temperature above the given temperature range, such as e.g. a temperature of 2 Q C. The strong mixing performed in the dissolution step provides a temperature increase to the solution. It should be noted that preferably during most part, i.e. more than 50% of the duration, of the dissolution step the solution is held within the temperature range of from −8 to −3 Q C. Furthermore, according to a preferred embodiment, the temperature is held within a range of from −6 to −3 Q C during the homogenization and during at least part of the dissolution.

According to one embodiment of the present invention, the vigorous mixing in the homogenization involves high shear mixing with a rotation speed of at least 1000 rpm, e.g. in the range of 1000-3000 rpm. As mentioned, the mixing in the dissolution step is not as vigorous. According to one embodiment of the present invention, the mixing in the dissolution is performed with a rotation speed of below 300 rpm, preferably in the range of from 10 to 200 rpm, such as in the range of from 10 to 100 rpm. The mixing in the dissolution step may have a different temperature depending on the specific type of arrangement which is used for carrying out the process. As mentioned, the temperature should be held below 0 Q C during at least part of the dissolution, however in case of a batch-wise process then the temperature at the end of the batch processing may be slightly above 0 °C. Preferably the process is performed so that the spinning dope composition produced in this step does not have a temperature above −3 °C. In the case of a continuous process, such as by use of a single CSTR or several CSTRs arranged in parallel, then the temperature preferably is held at a constant level, such as preferably below −3 °C, more preferably below −4 °C.

Also the type of starting material may of course be of relevance for the method according to the present invention. According to one embodiment of the present invention, the cellulosic pulp material being processed is a non-derivatised or low-derivatised cellulose pulp such as a carbamate derivatised cellulose pulp. Just to give a reference in relation to this, in WO03/064476 there is disclosed one method for the manufacturing of cellulose carbamate. Another example of the production of carbamate derivatised cellulose pulp is described in WO01/07485.

Furthermore, according to yet another embodiment, the cellulosic pulp material processed is pre-treated prior to homogenization by shortening the chains of cellulose polymers by cleavage of cellulose chains, preferably random cleavage of cellulose chains. The process of shortening of the chain may also be referred to as "adaptation". Furthermore, the shortening of the chains of cellulose polymers may be performed at least partly by wet grinding in water or alkali. According to yet another embodiment, the shortening of the chains of cellulose polymers is performed at least partly by means of a method selected among: hydrolysis with sulfuric acid, steam explosion treatment or hydrothermal treatment. Also other treatments are possible, such as weak acid hydrolysis or an enzymatic treatment or treatment with ionizing radiation (e.g. electron beam).

During the process of shortening the chains of cellulose polymers also other parameters than the actual chain length may be affected. One example is the viscosity value. The pre-treatment involving shortening of the chains may be performed so as to provide an intrinsic viscosity value, as measured in cupri-ethylenediamine (CED) solution according to ISO5351:2010(E), below 500, preferably below 300, most preferably below 275. Moreover, also the addition of the alkali may be performed in different ways. The alkali solution, e.g. comprising sodium hydroxide, may be added in only one step before or in the homogenization or may be added in two or several steps during the process. Furthermore, also the type and concentration of the alkali may vary according to the present invention. According to one embodiment, the alkali solution comprises sodium hydroxide in a concentration range of 7-8 wt % calculated on the total weight of the spinning dope composition. According to yet another embodiment, the concentration of sodium hydroxide is in the range of 7.2-7.8 wt %, preferably in the range of 7.4-7.6 wt %, such as around 7.5 wt % calculated on the total weight of the spinning dope composition.

Moreover, also the concentration of cellulose may vary according to the present invention. According to one embodiment, the concentration of cellulose is in the range of 5-12 wt % calculated on the total weight of the spinning dope composition. As suitable ranges for low derivatised pulp, then the concentration of cellulose is normally in the range of 6-12 wt %, and with a non-derivatised cellulose pulp the comparative range is in the range of 5-8 wt %.

Moreover, also other substances may be added according to the method of the present invention. According to one embodiment, an additive for gelation prevention is added so that the additive is present during the homogenization, said additive preferably being urea or comprising zinc. Such an additive is preferably added before or in the start of the homogenization step, however additives may also be added during other phases of the process. Moreover, according to one embodiment, the additive for gelation prevention, to be added so that it is present during the homogenization, is ZnO added in a concentration range of 0.5-2.0 wt %, e.g. 0.5-1.4 wt %, such as in a range of 0.8-1.2 wt %, calculated on the total weight of the spinning dope composition. A valid good example is a concentration of 7.5 wt % NaOH together with about 1.0 wt %, such as 1.1 wt % ZnO.

The method according to the present invention may be performed in many different modes of operation, such as batch, semi-batch and continuously. According to one preferred embodiment of the present invention, the method involving homogenization and dissolution is performed continuously.

In addition to the homogenization and dissolution step, and the possible pre-treatment step involving adaptation, the present invention may also involve other steps. According to one embodiment, the dissolution is finalized by passing the pulp material in the alkali solution through a mechanical working step in which high shear forces are applied to increase the temperature of the spinning dope to a point within the range of from 0 to 30 °C, such as in the range of from 5-10 °C. This step is a work-up step where the temperature is increased at the same time as the spinning dope composition is treated mechanically.

In relation to the present invention it may be mentioned that the spinning dope advantageously may be used for preparing regenerated cellulosic fibres, e.g. by extruding a spinning dope according to the present invention through several fine nozzles into a coagulation bath comprising one or more acids and/or one or more salts and additives or organic solvents.

A spinning dope composition is obtainable by the method disclosed above, said spinning dope composition comprising cellulose in a concentration range of 5-12 wt % and sodium hydroxide in a concentration range of 7-8 wt % calculated on the total weight of the spinning dope composition, wherein the filter clogging value of the spinning dope composition, in an un-filtered state, has a value in the range of 0-250, such as 0-200, e.g. 0-100, such as 10-200, preferably below 150, e.g. 10-70, and even below 50 in some cases.

The present invention provides an optimal spinning dope composition which has an enhanced stability against gelation and a really good clogging value.

According to one preferred embodiment of the present invention, the concentration range of sodium hydroxide is 7.2-7.8 wt % calculated on the total weight of the spinning dope composition. According to yet another preferred embodiment, the concentration range of sodium hydroxide is 7.4-7.6 wt %, such as preferably around 7.5 wt %, calculated on the total weight of the spinning dope composition.

According to yet another embodiment of the present invention, the spinning dope composition also comprises ZnO in a concentration range of 0.5-2.0 wt %, preferably in the range of 0.8-1.2 wt %, calculated on the total weight of the spinning dope composition. As mentioned above, also urea may be used instead of or in combination with ZnO.

To further provide an example of interest, a spinning dope composition according to the present invention comprising acid hydrolyzed dissolving pulp and around 7.5% NaOH/1.1% ZnO (wt %) show an exceptional stability against gelation when stored at temperatures in the range 5° C. to 21° C.

The present invention is also directed to a spinning dope composition production system comprising: —a homogenization unit adapted for receiving cellulosic pulp material and alkali solution, the homogenization unit comprising a high shear mixing means for homogenizing cellulosic pulp material in alkali solution, said homogenization unit being arranged to supply a power density of at least 150 kW/m3 to the high shear mixing means in the homogenization unit; and —a dissolution unit adapted for receiving cellulosic pulp material homogenized in alkali solution from the homogenization unit, the dissolution unit comprising mixing means for mixing cellulosic pulp material in alkali solution, said dissolution unit being arranged to supply a power density of maximum 75 KW/m3 to the mixing means in the dissolution unit. According to one embodiment of the present invention, the homogenization unit is arranged to supply a power density to the high shear mixing means used in the homogenization step in the range of 150-4000 kW/m3, preferably in the range of 150-2500 kW/m3, more preferably in the range of 200-2000 kW/m3; and where the dissolution unit is arranged to supply a power density to the mixing means in the dissolution unit of maximum 50 kW/m3, more preferably in the range of 2-50 kW/m3, still more preferably in the range of 5-30 kW/m3.

Furthermore, according to another embodiment of the present invention, the high shear mixing means of the homogenization unit is arranged to provide a rotation speed of at least 1000 rpm.

Moreover, according to yet another embodiment, the mixing means of the dissolution unit is arranged to provide a rotation speed of below 300 rpm.

According to one preferred embodiment, the dissolution unit comprises cooling means. It should be noted that also the homogenization unit may comprise cooling means. Therefore, according to one embodiment both the homogenization unit and the dissolution comprise cooling means.

System examples are provided in FIG. 4 and FIG. 5. It should be noted that the present invention embodies both parallel systems and systems working in series. Furthermore, different types of systems are possible. Examples are systems with a batch-wise or continuous dissolution unit(s). The homogenization step should be performed continuously however the set-up may be performed in one or more tube reactor(s), in series or parallel, or in one or more CSTR(s), in series or in parallel. In this connection it should be mentioned that CSTRs or other types of tank reactors may also be used as dissolution units, one or several, in series or in parallel. In one embodiment several parallel batch-wise operating tank reactors are used as dissolution unit, such that the dissolution step is performed in a semi-batch-wise mode. The homogenization step is, however, still performed continuously.

According to one preferred embodiment, the system of the present invention is a continuous system, where preferably the average residence time of the alkali solution and cellulosic pulp material in the dissolution unit is at least 5, preferably 10 times, more preferably at least 20 times, and most preferably at least 50 times larger than the average residence time of the alkali solution and cellulosic pulp material in the homogenization unit.

According to yet another embodiment, the system is continuous operating according to a plug flow principle, at least with regard to the homogenization unit. The latter is an advantage as fragments or residues of "old pulp" could otherwise increase the gelling tendency of the freshly supplied pulp.

Also combined system alternatives are fully possible. One such continuous alternative is where the homogenization unit operates according to a plug flow principle, such as being a tube reactor, and where the dissolution unit operates according to a continuous tank reactor principle. Continuous tank reactors may be arranged in series or in parallel according to the present invention.

Based on the above it may further be said that, according to one embodiment of the present invention, the homogenization is performed according to a plug flow principle and the dissolution is performed according to a continuous stirred tank reactor principle.

When using a plug flow alternative there is no recirculation/remains of partly dissolved cellulose in this stage. Furthermore, in the dissolution stage more time is needed, and this also needs to provide some buffering. Therefore, a CSTR is a good alternative for the dissolution unit.

The two mixing operations and the differences between them, when comparing the homogenization step, and unit for its execution, and the dissolution, and unit for its execution, is a key feature according to the present invention. According to one embodiment, the homogenization unit comprises a high shear rotor-stator mixer, e.g. operating with a mixing speed above 1000 rpm, such as in the range of 1000-3000 rpm. Moreover, according to another embodiment, the homogenization unit also comprises a twin axis counter rotating agitator, suitably arranged in series with a high shear rotor-stator mixer, e.g. operating with a mixing speed in the range of 1000-3000 rpm.

Moreover, according to yet another embodiment of the present invention, the dissolution means comprises a mixing means in the form of a rotating scraper, e.g. operating with a mixing speed below 300 rpm. The scraper facilitates heat transfer between the dope and the tank walls and also prevents freeze gelation against the tank walls. In this context it may be referred to the difference in power density between the homogenization step and the dissolution step, as discussed above.

Furthermore, the system preferably comprises one or more refining unit(s) connected to the dissolution unit(s). The refining unit is adapted for receiving cellulosic pulp material dissolved in alkali solution from the dissolution unit. The refining unit suitably comprises shearing means. These shearing means may operate according to a rotor-stator principle. According to one preferred embodiment, the refining unit is a high shear mixer, e.g. a high shear rotor/stator device, a device capable of intensively shearing the dope, such as e.g. "Homogenizer", which is available from Ing. A. Maurer S A, Ittigen, Switzerland. In such a device the dope is pumped between a stationary disc and a rotating disc, the two discs being arranged with a similar axis and at a distance from each other, giving rise to a strong shearing effect according to a refiner principle.

In the refining unit there is provided a temperature increase of the spinning dope composition by means of viscous dissipation, e.g. to a final temperature above 0 Q C, such as between 0-10 Q C, in the range of 0-15 Q C, or e.g. in the range of 5-15 Q C, and possibly also in the range of 10-20 Q C. According to one embodiment, the temperature increase, provided by the action of the refining unit, of the spinning dope composition results in a final temperature of the spinning dope composition being in the range of 5-10 Q C. Moreover, the residence time in the refiner is normally a few seconds (1-5 s) and the power density in the range of 1000 to 6000 kW/m3. One or several refiners may be used in parallel or in series.

As notable from above, the method according to the present invention may comprise at least one refining step performed subsequent to the dissolution step, said refining step providing viscous dissipation and a temperature increase to the spinning dope composition by means of shearing. According to one embodiment of the present invention, the temperature increase in the refining step is 0.2-10 Q C, preferably 2-8 Q C, more preferably 4-6 Q C. Furthermore, according to yet another preferred embodiment, the refining step is performed during a time of less than 120 seconds, preferably less than 60 s, more preferably less than 30 s, most preferably less than 15 s.

Furthermore, according to one embodiment of the present invention, the refining unit is arranged to supply (or the refining step is performed with) a power density (kW supplied to the refiner per mixed unit of liquid volume) in the range of 1000-8000 kW/m3, more preferably 1000-6000 kW/m3. Preferably the refining unit comprises two discs wherein at least one rotates in relation to the other. The latter may imply that e.g. both discs may rotate in different directions to one another, or one may be fixed and the other one in rotation. Preferably the two discs are arranged at a similar axis, and are arranged at a distance from each other.

Moreover, according to yet another embodiment, the refining unit is arranged to supply a power density (KW supplied to the refiner per mixed unit of liquid volume) in the range of 2000-6000 kW/m3, preferably in the range of 3000-5000 kW/m3.

The refining step may be performed as a final step, but can also be performed in between several dissolution steps, as may be seen in FIG. 5. Therefore, at least one further dissolution step may be performed subsequently to the refining step.

As a further explanation, the expression "refining" may also be interpreted as deagglomeration or deaggregation, i.e. a step involving to supply enough energy to provide mechanical dispersion.

It should be mentioned that the present invention is directed to the provision of an industrial process and industrial system therefore, implying a feed of cellulose pulp to the homogenization zone being higher than 100 kg/h, often higher than 500 kg/h, e.g. around 1000 kg/h or even 5000 kg/h.

It should further be noted that the system according to the present invention of course also may comprise other units and means of operation. Some examples are suitable transport and feed systems for the pulp material and alkali, pumps connected to the tube and/or tank units, e.g. rotor-stator pumps, and jacket cooling arrangements for the tank and/or tube units.

Furthermore, the tanks and/or tubes may also be provided with scrapers so that the walls are scraped to facilitate jacket cooling. This also facilitates to homogenize the mixture during the process.

DETAILED DESCRIPTION OF THE DRAWINGS

In FIGS. 1-3 there are shown graphs on the viscosity vs. shear rate in 7.0 wt % NaOH, 7.5 wt % NaOH and 8.0 wt % NaOH, respectively, in a spinning dope composition at different conditions. It should be noted that spinning dope composition with 7.0% NaOH and 8.0% NaOH show strong gelation (upturn in viscosity at low shear rates, d2 (log(r|))/d(log(y))2>0 for 1 s" 1<γ<10 s"1) already after 24 h storage at both 5° C. and 21° C. while the dope with 7.5% NaOH show a clear viscous behavior with only a small change in the viscosity curve even at storage for 48 h at 5° C. and 21° C. and d2 (log(r|))/d(log(y))2 is less than zero for 1 s"1<y<10 s"1. These figures present a clear indication that a concentration range of sodium hydroxide at 7.2-7.8 wt %, more preferably 7.4-7.6 wt %, or even around 7.5 wt %, calculated on the total weight of the spinning dope composition, such as according to the present invention, is a preferred concentration range.

In FIGS. 4 and 5 there are shown possible systems according to the present invention. These are further described below.

The following examples are intended to show the importance of a very quick dispersion of pulp fibers in cold alkali so that every fiber is experiencing the same chemical and thermal environment more or less instantaneously in order to produce a high quality dope with a low clogging value.

EXAMPLES

In an experiment alkali solution was cooled to −8.5° C. in a 0.5 L jacketed mixing vessel. Moist pulp (40% O.D. (oven dry), sulfuric acid treated Buckeye V67 cellulose pulp, IV=229 ml/g) stored at 0° C. was quickly added to the cold alkali solution in the mixing vessel where after homogenization and thereafter dissolution was immediately accomplished by means of a counter rotating (1000 rpm) twin rotor mixer (Electrolux, Easycompact, Model: EHM4 (100), available from Electrolux AB, SE). The mixing time was 14 minutes and the dope temperature was about −5° C. during mixing. 0.4 kg of dope with 5.5% cellulose, 8.0% NaOH and 1.2% ZnO was in this way manufactured. The clogging value of the resulting dope was 32 and no undissolved fiber fragments could be detected between crossed Polaroids in the microscope. In an otherwise identical experiment half of the pulp was added initially followed by 15 seconds of stirring at 1000 rpm. The second half of the pulp was then quickly added and the stirring continued up to 14 minutes. The clogging value of the resulting dope was 167 and some undissolved fiber fragments could be seen in the microscope.

A tentative explanation is that when the second half of the pulp was entering the vessel already a substantial part of the firstly added pulp had gone into solution making the mixture more viscous and thus hampering the transport (diffusion) of ions to and into the latterly added fibers. In a large scale batch process, it would be difficult to quickly disperse a large volume of pulp evenly in a large volume of solvent resulting in poor dissolution.

In another trial alkali solution was cooled to −8.5° C. in a 0.5 L jacketed mixing vessel. Moist pulp (44.0% O.D. sulfuric acid hydrolyzed Buckeye V67, IV=220 ml/g) stored at 0° C. was quickly added to (immersed into) the cold alkali solution in the mixing vessel where after the agitator of the counter rotating twin rotor mixer was put in place. Three different procedures were then used to dissolve the pulp.

A Mixing (1000 rpm) was immediately started after the introduction of pulp into the cold alkali in the mixing vessel. The mixing time was 14 minutes and the dope temperature was about −5° ° C. during mixing. 0.4 kg of dope with 6.3% cellulose, 7.5% NaOH and 1.1% ZnO was in this way manufactured. The clogging value of the resulting dope was 31 and no undissolved fiber fragments could be detected between crossed Polaroids in the microscope.

B) Mixing (1000 rpm) and dissolution was started 30 s after the introduction of pulp into the cold alkali in the mixing vessel. The mixing time was 14 minutes and the dope temperature was about −5° C. during mixing. 0.4 kg of dope with 6.3% cellulose, 7.5% NaOH and 1.1% ZnO was in this way manufactured. The clogging value of the resulting dope was 58 and some undissolved fiber fragments could be detected between crossed Polaroids in the microscope.

C) Mixing (1000 rpm) and dissolution was started 60 s after the introduction of pulp into the cold alkali in the mixing vessel. The mixing time was 14 minutes and the dope temperature was about −5° C. during mixing. 0.4 kg of dope with 6.3% cellulose, 7.5% NaOH and 1.1% ZnO was in this way manufactured. The clogging value of the resulting dope was 534 and undissolved fiber fragments could be detected between crossed Polaroids in the microscope.

A tentative explanation for high clogging values in the dopes is that the surface of pulp fiber agglomerates coming into contact with the cold alkali solution under static conditions quickly develops a highly viscous and cohesive layer making further dispersion and homogenization and diffusion of alkali into the pulp fibers difficult once the agitation of the mixing vessel is started. Cellulose molecules may go directly from a solid state into a gel state under static conditions where the local chemical environment is not optimal (high concentration of cellulose) and where dissolved molecules are not removed by convection. In a large scale batch process, it would be difficult to quickly disperse a large volume of pulp fibers evenly in a large volume of solvent. It can be expected that quite a large portion of cohesive pulp agglomerates would be created under more or less static conditions before they would be subjected to shearing action of an agitator/mixing element.

To circumvent the above mentioned problems associated with a batch process and problems related to slow and uneven dispersion of pulp in cold alkali a continuous process with care taken to the quick homogenization of pulp in alkali has shown to be helpful. Such a process example is shown in FIG. 4. In this variant moist shredded pulp (with or without a minor amount of alkali) at a temperature close to 0° C., but not being frozen, and with a consistency of about 12-90%, preferably 30-50%, is gravimetrically fed into a hopper by means of an arbitrary feeding device (e.g. transport band or screw feeder). If the pulp contains a few percent of alkali (NaOH<5%) the temperature of the pulp can be reduced below 0° C. Frozen pulp is disadvantageous for good dispersion of pulp in alkali. Cold liquid alkali (water and sodium hydroxide) containing a minor amount of dissolved ZnO is pumped into the hopper in a spiraling flow pattern flushing the hopper walls entraining the pulp down into a homogenization unit 1 being of the counter rotating intermeshing twin agitator type 2 or similar high efficiency mixer operating according to the plug flow principle. The mass flow rate and composition (concentration of NaOH and ZnO in water) of cold alkali and mass flow rate of pulp is adjusted so that that the composition of the combined stream going into the homogenization unit 1 is 5-8% cellulose, 7.2-7.8% NaOH and 0.8-1.2% ZnO.

The temperature of cold alkali is further adjusted so that the resulting temperature after combining and intimately mixing alkali and pulp in the homogenization unit 1 is in the range −8° C. to −3° C., preferably −6° C. to −4° C. The speed of the pump 4 is adjusted so that the slurry/liquid level in the hopper is maintained constant during operation. The high shear (HS) mixer 3 being a part of the homogenization unit 1 is of the rotor-stator type. The vigorous mixing of pulp and liquid in the mixers of the homogenization unit 1 ensures that the pulp fibers are almost instantaneously dispersed and that the fibers are experiencing a homogeneous chemical and thermal environment more or less instantaneously, preferably within not more than about 120 seconds, more preferably not more than about 60 seconds, still more preferably not more than about 30 seconds, and most preferably not more than 15 seconds after combining alkali and pulp. The alkali pulp slurry is further pumped into a stirred tank (dissolution unit 5) with a rotating scraper 7 also functioning as an agitator. Optionally the stirred tank of the dissolution unit 5 can be equipped with an internal high shear mixer in addition to the scraper 7. The scraper 7 is important to avoid gelation of the spinning dope against the cold tank walls. The volume (size) of the stirred tank, which may operate according to the continuous stirred tank reactor (CSTR) principle, is adjusted so that the average residence time is about 5 to 15 minutes. The jacketed stirred tank is tempered to about −5° C. The dope is then pumped through a set of refining units 6 (one or more in series) whereby temperature of the dope is increased by means of viscous dissipation (shearing) to a final temperature of about 0° to 20° C., such as from 5 to 15° C., e.g. 5° to 10° C., but it may also be from 10° to 20° C.

In another variant, depicted in FIG. 5, aqueous pulp slurry with or without alkali at a temperature close to 0° C., but not being frozen, and with a consistency of about 8-15%, preferably 9-12%, is pumped into the inlet of a homogenization unit 1 comprising a high shear mixer 3 of the rotor-stator type. If the aqueous pulp slurry contains a few percent of alkali (NaOH<5%) the temperature can be reduced below 0° C. Cold liquid alkali (water and sodium hydroxide) containing a minor amount of dissolved ZnO is also pumped into the inlet of the same high shear mixer 3. The vigorous mixing ensures that the pulp fibers are almost instantaneously dispersed and that the fibers are experiencing a homogeneous chemical and thermal environment more or less instantaneously, at least within 120 seconds, preferably within 60 seconds, still more preferably within 30 seconds, and most preferably within 15 seconds, after combining alkali and pulp. The mass flow rate and composition (concentration of NaOH and ZnO in water) of cold alkali and mass flow rate of pulp is adjusted so that that the composition of the combined stream going into the high shear mixer 3 is 5-8% cellulose, 7.2-7.8% NaOH and 0.8-1.2% ZnO. The temperature of cold alkali is further adjusted so that the resulting temperature after combining and intimately mixing alkali and pulp in the high shear mixer 3 of the homogenization unit 1 is in the range −8° C. to −3° C., preferably −6° C. to −4° C. The alkali pulp slurry is further guided into a stirred tank (dissolution unit 5) with a rotating scraper 7. Optionally the stirred tank of the dissolution unit 5 can be equipped with an internal high shear mixer in addition to the scraper 7. The scraper 7 is important to avoid gelation of the spinning dope against the cold tank walls. The volume (size) of the dissolution unit 5 is adjusted so that the average residence time is about 5 to 15 minutes. The dope is then pumped through a set of refining units 6 (one or more in series) whereby temperature of the dope is increased by means of viscous dissipation (shearing) to a temperature of about 0° to 20° C., such as from 5 to 15° C., e.g. 5 to 10° C., but it may also be from 10° to 20° C.

A continuous dissolution process is preferred. Batch-wise dissolution is problematic as illustrated by the following example. When dissolving pulp in cold alkali in a batch-wise fashion the dope quality in terms of clogging value (a measure of how quick the flow rate decreases when the dope is passing a filter media under a given constant pressure drop) deteriorates in consecutive batches after that the first batch is dissolved in a clean dissolving tank. A high clogging value (CV) indicates that the dope contains a high concentration of gel particles and/or undissolved fiber fragments that clog the subsequent filter. In the following example 35 kg dope batches were prepared in a 60-liter jacketed batch mixer (dissolution unit 5) equipped with a scraper 7 and an internal high shear mixer. The recipe was 5.3% cellulose (Sulfuric acid hydrolyzed Buckeye V67, IV=229 ml/g), 8% NaOH and 1.2% ZnO. Alkali solution (9.4% NaOH, 1.4% ZnO and the balance H2 O) was cooled to −9.8° C. Set temperature of the cooling jacket of the dissolution unit 5 was −5° C. 30.3 kg cold alkali was pumped into the dissolution unit 5 where after 4.7 kg moist pulp of 0° C. was added. The dissolution unit 5 was closed and scraper 7 and high shear mixer were started. The high shear mixer was run for 3 minutes. The dope temperature was then about −4.5° C. After 12 minutes the high shear mixer was started again and was run until the dope temperature attained 5° C. After the first dissolution batch the dope was poured out from the dissolution tank leaving about 0.5 kg of dope on the tank walls and mixing elements (scraper and high shear mixer). The process was then repeated and in total 3 consecutive batches were produced under identical conditions. No undissolved fiber fragments could be detected under the microscope between crossed Polaroids in any of the dopes. However, the measured clogging values of the batches were 16, 146 and 160 respectively. The result can be explained by dope remaining on the dissolution unit walls is gelling against the cold dissolution unit surfaces during the emptying phase and is contaminating the subsequent batch. It can even be that remaining dope is freeze gelling in contact with cold alkali having a temperature below the freezing point of the dope. It is thus difficult to produce high quality dopes in a batch-wise fashion without thoroughly cleaning the dissolution unit 5 between batches, a process that would be time consuming, expensive and impractical.

FIG. 5 also illustrates an alternative arrangement for the dissolution unit 5. At the lower portion of FIG. 5 there is shown an arrangement with a dissolution unit 5 comprising three relatively small continuous stirred tank reactors (CSTR) 105', 105", 105"' arranged in series, wherein the dope is transported along the dashed line from the high shear mixer 3 of the homogenization unit 1 and then passes through each of the three consecutive CSTR's of the dissolution unit 5 and further to the refining units 6. This arrangement reduces the risk that a portion of the dope passes through the dissolution unit 5 without undergoing the desired residence time for proper dissolution of the cellulose polymers in the alkali solution. As notable from FIG. 5, the dissolution units 5 may be arranged one as a standalone unit or with several units in series or parallel. As shown, if several dissolution units 5 are arranged in series, then one or more refining units 106 may be arranged in between the one or more dissolution units 105', 105", 105"'.

In FIG. 6. there is shown a preferred range, or window, of power density vs. residence time in the homogenizer according to the present invention. Moreover, in FIG. 7 there is shown a preferred range, or window, of power density vs. residence time in the dissolver according to the present invention. Based on the above it should be said that according to one embodiment of the present invention, the product of power density*residence time may be in the range of 4000-20000 (kW*s)/m3, preferably in the range of 6000-14000 (kW*s)/m3, in a power density range of 200-2000 kW/m3 and for residence times in the range of 1-30 seconds in the homogenization step; and the product of power density*residence time may be in the range of 4000-25000 (kW*s)/m3, preferably in the range of 7000-15000 (kW*s)/m3, in a power density range of 4-50 kW/m3 and for residence times in the range of 240-1800 seconds in the dissolution step.

Furthermore, in FIG. 8 there is shown a preferred range, or window, of power density vs. residence time in a refiner according to the present invention. Based on the above it may be said that according to one embodiment of the present invention, the product of power density*residence time may be in the range of 2000-15000 (kW*s)/m3, preferably in the range of 3000-12000 (kW*s)/m3, in a power density range of 1000-6000 kW/m3 and for residence times in the range of 0.5-5 seconds in the refining step.

The invention claimed is:

1. A method for the production of a spinning dope composition, said method comprising
a homogenization step involving vigorous mixing of a cellulosic pulp material in alkali solution, vigorous mixing implying supplying a power density of at least 150 kW/m$^3$ (KW supplied to agitators per mixed unit of liquid volume) to agitators used in the homogenization step, and thereafter
a dissolution step involving mixing of the cellulosic pulp material in the alkali solution to obtain a spinning dope composition,
wherein the homogenization is performed during a time of less than 120 s.

2. The method according to claim 1, wherein the power density supplied to agitators used in the dissolution step is maximum 75 kW/m$^3$ (kW supplied to agitators per mixed unit of liquid volume).

3. The method according to claim 1, wherein the cellulosic pulp material in alkali solution is kept at a temperature of less than 0° C. during the homogenization.

4. The method according to claim 1, wherein the cellulosic pulp material in alkali solution is kept at a temperature of less than 0° C. during the homogenization and during at least part of the dissolution.

5. The method according to claim 1, wherein the power density supplied to agitators used in the homogenization step is in the range of 150-4000 kW/m$^3$, and wherein the power density supplied to agitators used in the dissolution step is maximum 50 kW/m$^3$.

6. The method according to claim 1, wherein the dissolution is performed during a time period sufficient for substantially complete dissolution of the cellulose polymers of the cellulosic pulp material in the alkali solution.

7. The method according to claim 1, wherein the homogenization is performed during a time of less than 60 s.

8. The method according to claim 1, wherein the dissolution is performed during a time of at least 4 minutes.

9. The method according to claim 1, wherein the power density supplied to agitators used in the homogenization step is in the range of 150-2500 kW/m$^3$ (KW supplied to agitators per mixed unit of liquid volume).

10. The method according to claim 1, wherein the power density supplied to agitators used in the dissolution step is in the range of 2-50 kW/m$^3$.

11. The method according to claim 1, wherein:
the product of power density*residence time is in the range of 4000-20000 (KW*s)/m$^3$ in a power density range of 200-2000 kW/m$^3$ and for residence times in the range of 1-30 seconds in the homogenization step; and
the product of power density*residence time is in the range of 4000-25000 (KW*s)/m$^3$ in a power density range of 4-50 kW/m$^3$ and for residence times in the range of 240-1800 seconds in the dissolution step.

12. The method according to claim 4, wherein the temperature in the cellulosic pulp material in alkali solution is held within a range of from −8 to −3° C. during the homogenization and during at least part of the dissolution.

13. The method according to claim 1, wherein the vigorous mixing in the homogenization involves high shear mixing with a rotation speed of at least 1000 rpm.

14. The method according to claim 1, wherein the mixing in the dissolution is performed with a rotation speed below 300 rpm.

15. The method according to claim 1, wherein the cellulosic pulp material being processed is a non-derivatised or low-derivatised cellulose pulp.

16. The method according to claim 1, wherein the method also comprises at least one refining step performed subsequent to the dissolution step, said refining step providing viscous dissipation and a temperature increase to the spinning dope composition by means of shearing.

17. The method according to claim 16, wherein the temperature increase in the refining step is 0.2-10° C.

18. The method according to claim 16, wherein the refining step is performed with a power density (KW supplied to the refiner per mixed unit of liquid volume) in the range of 1000-8000 kW/m$^3$.

19. The method according to claim 16, wherein the refining step is performed with a power density (kW supplied to the refiner per mixed unit of liquid volume) in the range of 2000-6000 kW/m$^3$.

20. The method according to claim 16, wherein the product of power density*residence time is in the range of 2000-15000 (kW*s)/m$^3$ in a power density range of 1000-6000 kW/m$^3$ and for residence times in the range of 0.5-5 seconds in the refining step.

21. The method according to claim 16, wherein at least one further dissolution step is performed subsequent to at least one of said at least one refining step.

22. The method according to claim 1, wherein the cellulosic pulp material is pre-treated prior to homogenization by shortening the chains of cellulose polymers by cleavage of cellulose chains.

23. The method according to claim 22, wherein the shortening of the chains of cellulose polymers is performed at least partly by wet grinding in alkali.

24. The method according to claim 22, wherein the shortening of the chains of cellulose polymers is performed at least partly by a method selected among: hydrolysis with sulfuric acid, steam explosion treatment, hydrothermal treatment.

25. The method according to claim 1, wherein the alkali solution comprises sodium hydroxide in a concentration range of 7-8 wt % calculated on the total weight of the spinning dope composition.

26. The method according to claim 25, wherein the concentration of sodium hydroxide is in the range of 7.2-7.8 wt % calculated on the total weight of the spinning dope composition.

27. The method according to claim 1, wherein a concentration of cellulose is in the range of 5-12 wt % calculated on the total weight of the spinning dope composition.

28. The method according to claim 1, wherein an additive for gelation prevention is added so that the additive is present during the homogenization.

29. The method according to claim 28, wherein the additive for gelation prevention is ZnO added in a concentration range of 0.5-1.4 wt % calculated on the total weight of the spinning dope composition.

30. The method according to claim 1, wherein the method involving homogenization and dissolution is performed continuously.

31. The method according to claim 1, wherein the dissolution is finalized by passing the pulp material in the alkali solution through a mechanical working step in which high shear forces are applied to increase a temperature of the spinning dope composition to a point within the range of from 0 to 30° C.

32. The method according to claim 1, said method also involving a subsequent treatment of the spinning dope composition in a coagulation bath.

33. The method according to claim 1, wherein the homogenization is performed according to a plug flow principle and the dissolution is performed according to a continuous stirred tank reactor principle.

34. The method according to claim 1, wherein the homogenization is performed during a time of less than 30 s.

35. The method according to claim 1, wherein the homogenization is performed during a time of less than 15 s.

36. The method according to claim 1, wherein the power density (kW supplied to agitators per mixed unit of liquid volume) supplied to agitators used in the homogenization is at least a factor 5 higher than the power density supplied to agitators used in the dissolution.

37. The method according to claim 1, wherein the power density (kW supplied to agitators per mixed unit of liquid volume) supplied to agitators used in the homogenization is at least a factor 10 higher than the power density supplied to agitators used in the dissolution.

38. The method according to claim 1, wherein the time for performing the dissolution is at least a factor 5 longer than the time for performing the homogenization.

39. The method according to claim 1, wherein the time for performing the dissolution is at least a factor 10 longer than the time for performing the homogenization.

40. The method according to claim 1, wherein the dissolution is performed during a time of 5-60 minutes.

41. The method according to claim 16, wherein the refining step is performed with a power density (kW supplied to the refiner per mixed unit of liquid volume) in the range of 1000-6000 kW/m3.

42. The method according to claim 16, wherein the refining step is performed with a power density (KW supplied to the refiner per mixed unit of liquid volume) in the range of 3000-5000 kW/m3.

43. The method according to claim 28, wherein the additive is urea or comprising zinc.

44. The method according to claim 32, wherein the coagulation bath comprises sodium carbonate or sodium sulfate.

* * * * *